United States Patent
Cavallaro et al.

(10) Patent No.: US 6,676,541 B2
(45) Date of Patent: Jan. 13, 2004

(54) CO-INJECTION MOLDED DOUBLE COVERED GOLF BALL

(75) Inventors: Christopher Cavallaro, Lakeville, MA (US); Michael D. Jordan, East Greenwich, RI (US)

(73) Assignee: Acushnet Company, Fairhaven, MA (US)

(*) Notice: Subject to any disclaimer, the term of this patent is extended or adjusted under 35 U.S.C. 154(b) by 50 days.

(21) Appl. No.: 10/055,232

(22) Filed: Jan. 23, 2002

(65) Prior Publication Data

US 2003/0139228 A1 Jul. 24, 2003

(51) Int. Cl.$^7$ ............................................. A63B 37/06
(52) U.S. Cl. ........................................................ 473/376
(58) Field of Search ................................ 473/376, 356, 473/357, 367, 368, 370, 371, 374

(56) References Cited

U.S. PATENT DOCUMENTS

| | | | | |
|---|---|---|---|---|
| 727,202 | A | * 5/1903 | Richards | 473/370 |
| 2,258,333 | A | * 10/1941 | Miller | 473/364 |
| 3,262,272 | A | 7/1966 | Barakauskas et al. | 60/39.05 |
| 3,454,280 | A | 7/1969 | Harrison et al. | 473/385 |
| 3,819,768 | A | 6/1974 | Molitor | 260/89.7 |
| 4,431,193 | A | 2/1984 | Nesbitt | 473/374 |
| 4,919,434 | A | 4/1990 | Saito | 473/373 |
| 5,314,187 | A | 5/1994 | Proudfit | 473/373 |
| 5,334,673 | A | 8/1994 | Wu | 473/378 |
| 5,484,870 | A | 1/1996 | Wu | 528/28 |
| 5,688,191 | A | 11/1997 | Cavallaro et al. | 473/373 |
| 5,783,293 | A | 7/1998 | Lammi | 428/212 |
| 5,824,746 | A | 10/1998 | Harris et al. | 525/196 |
| 5,885,172 | A | * 3/1999 | Hebert et al. | 473/354 |
| 5,971,870 | A | 10/1999 | Sullivan et al. | 473/373 |
| 6,025,442 | A | 2/2000 | Harris et al. | 525/221 |
| 6,159,110 | A | * 12/2000 | Sullivan et al. | 473/374 |
| 6,190,268 | B1 | * 2/2001 | Dewanjee | 473/370 |
| 6,210,294 | B1 | 4/2001 | Wu | 473/377 |
| 6,416,425 | B1 | * 7/2002 | Maruko et al. | 473/376 |
| 6,419,595 | B1 | * 7/2002 | Maruko et al. | 473/376 |
| 6,461,251 | B1 | * 10/2002 | Yamagishi et al. | 473/376 |
| 6,468,168 | B1 | * 10/2002 | Nesbitt et al. | 473/357 |
| 6,527,652 | B1 | * 3/2003 | Maruko et al. | 473/371 |
| 2002/0019268 | A1 | * 2/2002 | Tsunoda et al. | 473/351 |
| 2002/0042308 | A1 | * 4/2002 | Tsunoda et al. | 473/351 |

* cited by examiner

Primary Examiner—Mark S. Graham
Assistant Examiner—Raeann Gorden
(74) Attorney, Agent, or Firm—D. Michael Burns

(57) ABSTRACT

The present invention is directed towards a multi-layered golf ball, at least the inner cover having multiple layers formed by a sandwich injection molding process, wherein each multi-layered cover comprises an inner layer and an outer layer of a first material and an intermediate layer therebetween of a second material. The materials having different properties. An embodiment of the invention includes both covers being multi-layered formed by the sandwich injection molding process.

16 Claims, 6 Drawing Sheets

CO-INJECTION MOLDED DOUBLE COVERED GOLF BALL

FIELD OF INVENTION

The invention relates generally to golf balls, and more specifically, to a multi-layered golf ball having cover layers that are co-injection molded. Each co-injection molded cover layer consists of three thin layers.

BACKGROUND OF THE INVENTION

It is well known that golf balls are typically constructed with a cover that tightly surrounds a core. It is typical for a golf ball core to have a solid construction or a wound construction and the methods of forming these cores are well known in the art. Traditionally, golf ball covers are formed from polymeric materials. For instance, golf balls have traditionally incorporated covers made of balata rubber, which may be a natural balata, a synthetic balata, or a blend of natural and synthetic balata.

Other golf balls have incorporated covers which are formed from synthetic polymeric materials such as polyolefins and in particular, polyethylene, polyurethanes, and ionic copolymers of olefins. The latter mentioned ionic copolymers of olefins were commercially introduced in the mid 1960's by E. I. Du Pont de Nemours & Co., Inc., Wilmington, Del. (DuPont) and sold under the trademark "SURLYN." Golf balls incorporating SURLYN covers are generally described in U.S. Pat. No. 3,454,280. Cover compositions that are based on SURLYN resins are advantageous in that the resulting covers are cut and abrasion resistant compared to the balata covers. While golf balls incorporating SURLYN resin covers are commonly known by players to be more cut resistant than balata covered balls, they traditionally tend to reduce the spin imparted to a golf ball and produce a less desirable "feel" as compared to a balata covered ball.

SURLYN resins sold by DuPont typically contain zinc, lithium, magnesium or sodium ions. A number of SURLYN resins, of varying physical properties, are sold by DuPont. The physical properties of these resins are described in technical bulletins that are readily available from DuPont. Mixtures of various SURLYN resins as cover stock materials are likewise highly advantageous. Suitable mixtures for use as cover materials are described in U.S. Pat. No. 3,819,768.

For purposes of control, golfers strike a golf ball in such a manner that the ball has substantial backspin. It is desirable that a golfer be able to impart backspin to a golf ball for purposes of controlling its flight and controlling the action of the ball upon landing on the ground. For example, substantial backspin will make the ball stop once it strikes the landing surface instead of bounding forward. The ability to impart back spin onto a golf ball is related to the deformation of the golf ball cover when struck with a golf club. Generally, the more deformable the cover is, the easier it is to impart spin to the balls. This is particularly true for short or wedge shots.

Thus, it is desirable to combine the properties of SURLYN covered golf balls with the properties of Balata covered golf balls. For example it is desirable to have less spin on a drive, such that the ball will have a "low spin trajectory". The result is that the ball does not climb like a typical high spin rate ball would, and the ball has substantial roll after it lands on the ground to provide maximum distance. On the other hand, for approach shots, i.e., short shots into the green, spin is critical to control the ball when it lands. With a high spin rate, the ball will stop or "sit" when it hits the green. Thus, with a high spin rate, the ball can be hit directly at the target. With a low spin rate, the ball often bounces off the green or "runs" off the green. Thus, it is desirable to have a high spin rate for approach shots into the green.

Further, it is desirable to combine the durability of SURLYN covered balls with the characteristics of balata covered balls.

Typically, the golf ball cover layer is formed by one of two processes. The first process includes the compression molding of hemispheres. First, two hemispherical covers, called half-shells, are injection molded. The hemispheres are then placed around a core and compression molded so that they fuse around the core and wherein dimples are imparted into the cover. The cover is then finished to remove any visible molding lines or residue. The second process, called the retractable pin injection molding process, involves injection molding of the cover directly around a core positioned on pins, removing the pins once the cover material surrounds the core, removing the covered core, and finishing it to form a completed golf ball. In both cover forming processes, the injection molding of the covers involves techniques known in the art. These techniques generally involve forcing melted material to substantially fill and take on the shape of a mold, thereby forming a cover or hemisphere. When the material is cool enough to substantially maintain the shape of the mold, it is ejected from the mold.

Typically, the cover material begins the injection molding process as resin pellets that are stored in a hopper. The pellets are gravity fed into a heated cylinder that melts the pellets as a screw simultaneously pushes the softening pellets toward an accumulation zone. When enough melted material is accumulated to fill the mold, the screw is pushed or stroked forward, thereby forcing the melted material into the mold. Many prior art references are directed to mixing different materials to form new cover materials. This is traditionally accomplished by mixing pellets of different materials in the injection mold hopper.

There are also many patents that are directed to golf balls having multiple cover layers. For example, U.S. Pat. No. 4,431,193 relates to a golf ball having a multilayer cover wherein the inner layer is a hard, high flexural modulus ionomer resin and the outer layer is a soft, low flexural modulus ionomer resin, and wherein either or both layers may comprise a foamed ionomer resin.

U.S. Pat. No. 5,314,187 also relates to golf balls having multiple layer covers, wherein the outer layer is molded over the inner layer and comprises a blend of balata and an elastomer where the inner layer is an ionomer resin.

U.S. Pat. No. 4,919,434 is directed towards a golf ball having a cover which comprises an inner layer and an outer layer each of which is a thermoplastic resin. Preferably the layers comprise thermoplastic resin materials that are capable of fusion bonding with each other.

U.S. Pat. No. 5,783,293 discloses a golf ball with a multi-layered cover formed by a co-injection molding process, wherein the golf ball cover comprises an inner and outer layer of a first material and an intermediate layer therebetween of a second material.

SUMMARY OF THE INVENTION

The present invention relates to golf balls having a double cover consisting of an inner cover and an outer cover. One embodiment of the present invention provides for the inner cover to consist of three thin layers, that are formed by a co-injection molded process as disclosed in U.S. Pat. No. 5,783,293, which is incorporated by reference herein in its entirety. In a preferred embodiment, the outer cover is a thermoset urethane that is cast over the inner cover. The resulting golf ball has a total of four cover layers and five total layers for a solid core ball and six total layers for a wound core or dual layered, solid core ball.

Another embodiment of the invention provides for only the outer cover to be to consist of three thin layers, which are formed by the co-injection process. Preferably, the inner cover has a high vicat softening point of 0.2 and is a thermoset material.

An additional embodiment of the invention provides for a golf ball, wherein both covers consist of three thin layers formed by the co-injection process. The resulting golf ball will have a total of six cover layers and seven total layers for a solid core ball and eight total layers for a wound core or dual core ball.

The cover layers are as thin as 0.005 inches and consist of a sandwich configuration of two different materials. The manipulation of layer thickness and material selection that effects the density, hardness, COR, etc. greatly effects ball performance.

The use of thin multi-layers, in combination with gravity adjusting materials creates moment of inertia gradients across the cover layers.

The present invention is also directed towards a golf ball having multi-layer covers formed by a co-injection molding process, whereby a first material is divided into an inner layer and an outer layer by an injected intermediate layer of a second material. More particularly, the inner and outer layers are preferably thinner than the intermediate layer. The intermediate layer is preferably about ⅖ to ⅘ of the cover thickness and the outer layer is less than about ⅕ of the cover thickness.

The first and second cover materials each may be a dynamically vulcanized thermoplastic elastomer, a functionalized styrene-butadiene elastomer, a polyetherester, a polyesterester, a metallocene polymer, a thermoplastic polyetheramide, a thermoplastic ionomer, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylenevinyl alcohol polymer, a tetrafluoroethylene polymer, a reinforced polymer, or blends thereof.

DETAILED DESCRIPTION OF THE INVENTION

Figure 1:
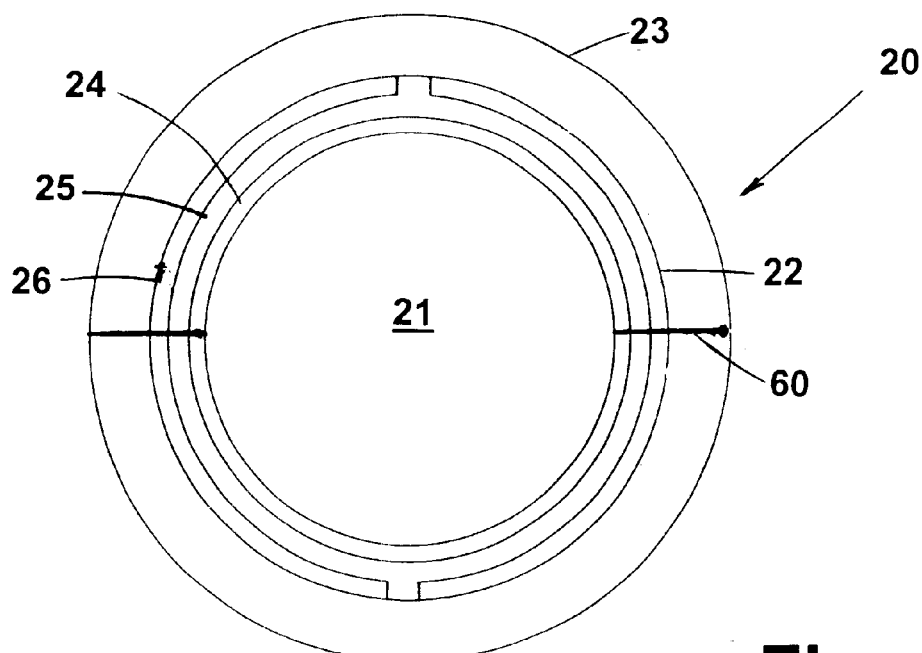
FIG. 1 is a golf ball according to an embodiment of the present invention disclosing a dual cover, with the inner cover consisting of three thin layers of two different materials formed by a co-injection molding process.
Figure 2:
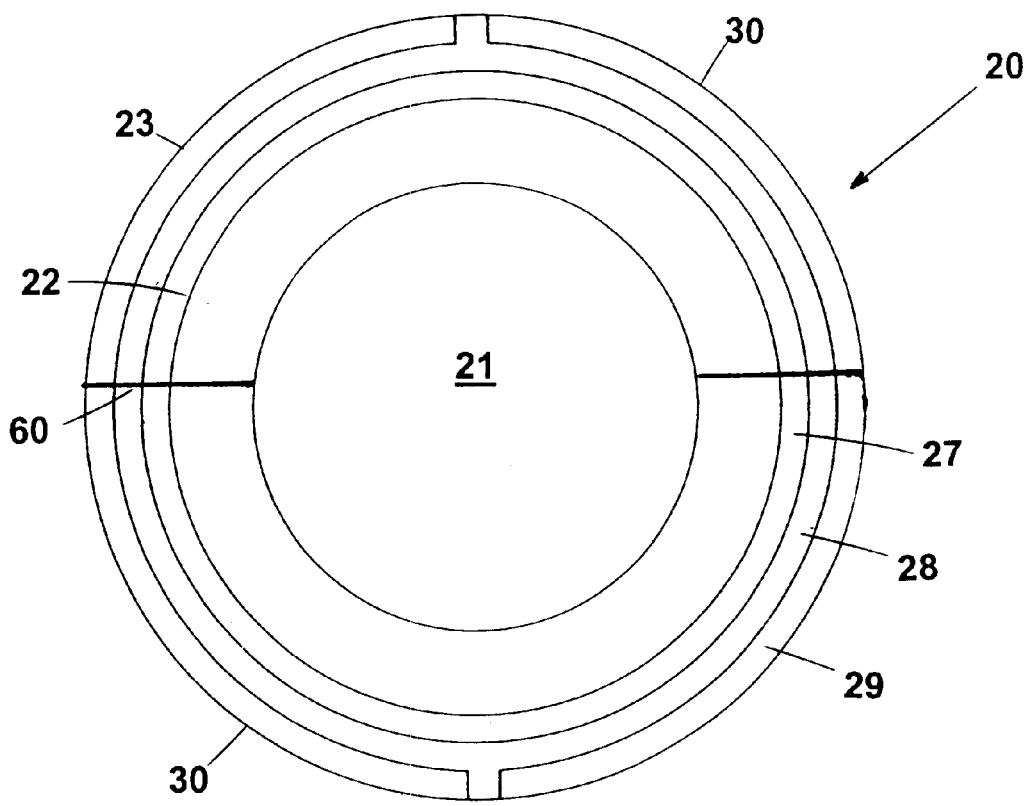
FIG. 2 is a golf ball according to FIG. 1, wherein the outer cover consists of three thin layers formed by a co-injection process.
Figure 3:
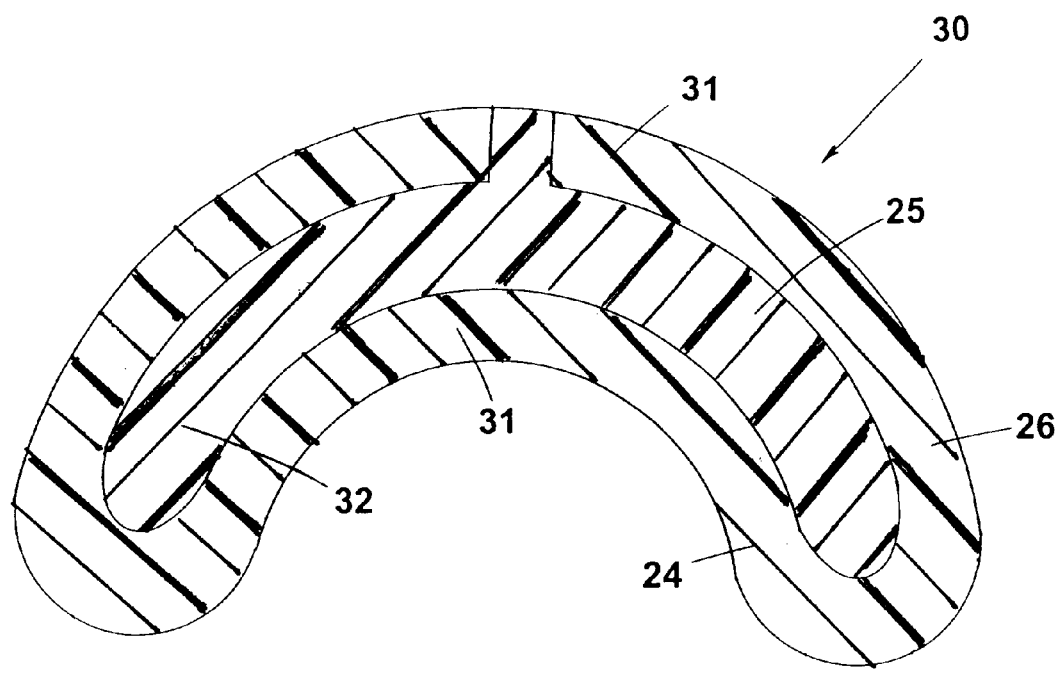
FIG. 3 is a ball cover hemisphere.
Figure 4:
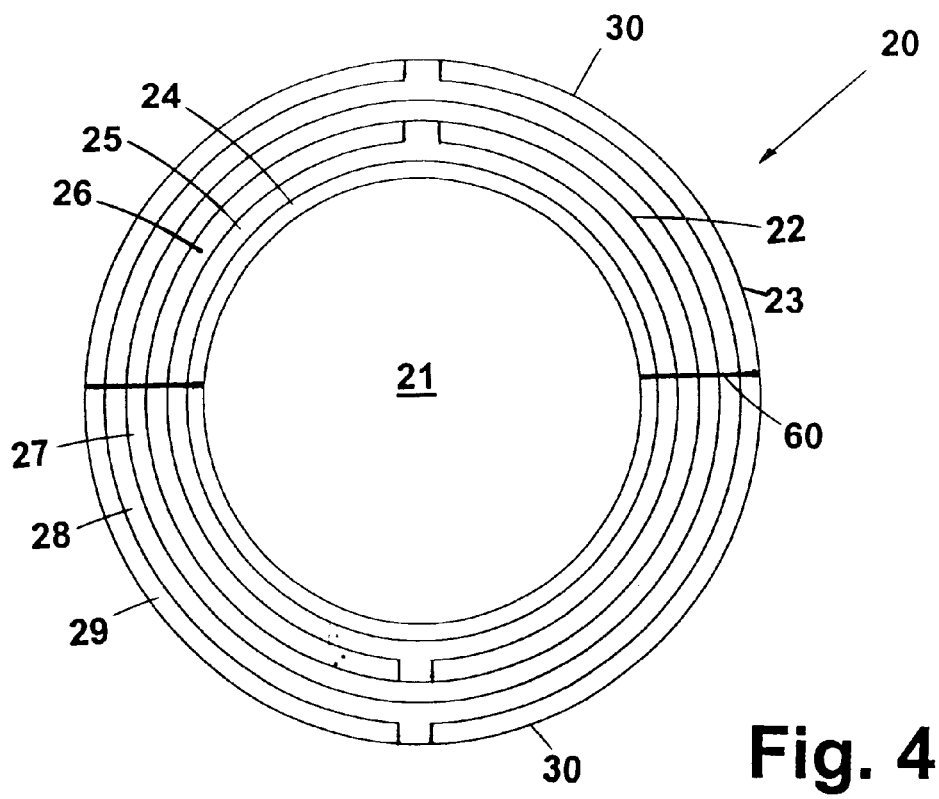
FIG. 4 is a golf ball wherein both the inner cover and outer covers consist of three thin layers of two different materials and are formed by a co-injection process.
Figure 5:
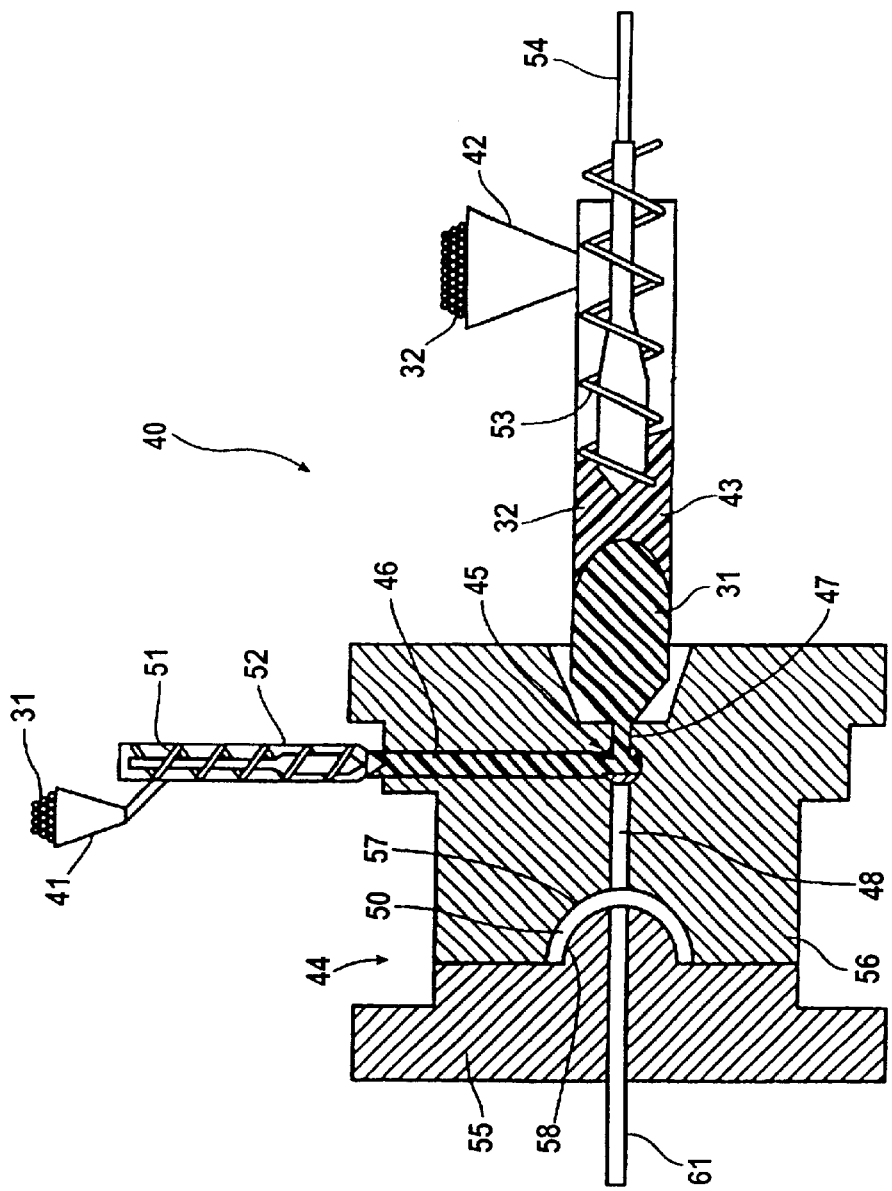
FIG. 5 is an elevational sectional view of a multi-material injection molding machine for making ball cover hemispheres.

Referring to FIGS. 1, 2 and 4, a golf ball 20 having a core 21, an inner cover 22 and an outer cover 23 is shown. FIG. 1 shows the inner cover 22 consisting of three thin layers 24, 25 and 26 formed by a co-injection molding machine and process as described in U.S. Pat. No. 5,783,293. This process employs a sandwich injection molding machine 40, as shown in FIG. 5, and produces a two-material, golf ball cover hemisphere 30, as depicted in FIG. 3. The layers 24, 25 and 26 are as thin as 0.005 inches and the resulting golf ball 20 will have four cover layers and a total of five layers for a solid core ball and six total layers for a wound core or dual core ball. FIG. 2 describes the outer cover 23 having three thin layers 27, 28 and 29 formed by the co-injection process. FIG. 4 illustrates the golf ball 20 having both covers 22 and 23 each consisting of the three co-injection molded layers 24, 25, 26 and 27, 28, 29 respectively. This provides for a ball having six cover layers and a total of seven layers for a solid core ball and eight total layers for a wound core or dual core ball. The manipulation of layer thickness and material selection greatly effects the hardness, COR, and moment of inertia which subsequently effects ball performance. The use of gravity adjusting materials, moisture barriers and hardness gradients will be discussed later.

Referring to FIG. 5, a sandwich injection-molding machine 40 for producing a golf ball cover hemisphere 30 having two-materials is shown. The injection molding machine 40 includes two hoppers 41 and 42, an accumulation chamber 43, a mold 44, a three-way valve 45, and a plurality of channels 46, 47 and 48 interconnecting the same. More particularly, a first hopper 41 contains a first material 31 and a second hopper 42 contains a second material 32. The three-way valve 45 controls the flow direction of the materials 31 and 32. The first channel 46 connects the first hopper 41 with the three-way valve 45. The second channel 47 connects the accumulation chamber 43 to the three-way valve 45. The third channel 48 connects the three-way valve 45 with the mold cavity 50.

The process comprises the steps of, pellets of a first material 31 being loaded into hopper 41, where they feed by gravity or other means known in the art to screw 51. Then heat is applied to plasticize the first material 31 and screw 51 turns within cylinder 52 to pump a measured amount of plasticized first material 31 through channel 46 to the three-way valve 45. The material is heated above its melt temperature and preferably to a temperature greater than about 400° F. The three-way valve 45 is positioned such that the flow of the molten first material 31 is fed into the accumulation chamber 43. The accumulation chamber 43 is heated such that the material remains in the molten state. Next, the valve 45 selectively permits material flow from channel 46 into accumulation chamber 43 (see FIG. 8); and material flow from accumulation chamber 43 to mold cavity 50 without diversion back into channel 46 (see FIG. 9).

Pellets of a second material 32 are then loaded into hopper 42, where they feed by gravity or other means known in the art to screw 53. Heat is then applied to plasticize the second material 32. The material is heated above its melt temperature and preferably to a temperature greater than about 400° F. Screw 53 forces a measured amount of plasticized second material 32 into accumulation chamber 43, where the second material 32 and the first material 31 are juxtaposed.

Figure 8:
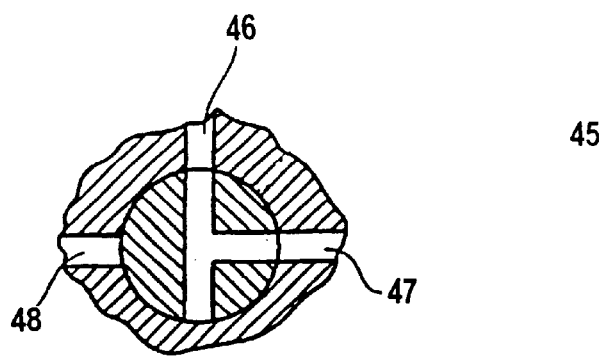
FIG. 8 is an enlarged section of FIG. 5 showing the mold three-way valve.
Figure 9:
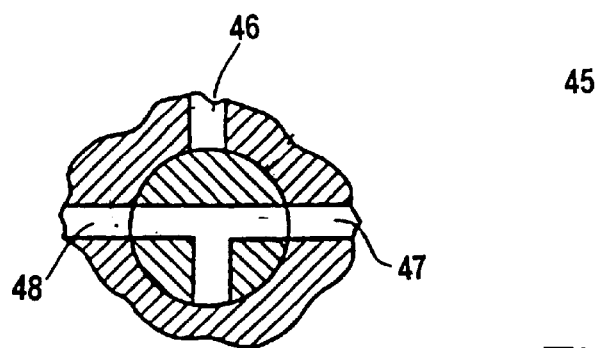
FIG. 9 is an enlarged section of FIG. 5 showing the mold three-way valve.

The first step of the process includes inserting a predetermined amount of the second material 32 into the heated accumulation chamber 43 with the three-way valve 45 closed. Then a predetermined amount of the first material 31 is inserted into the accumulation chamber 43 through the three-way valve 45 as shown in FIG. 8. Thereafter, the position of three-way valve 45 is changed, such that the flow path to channel 46 is closed, and the flow path through passageway 48 to the mold cavity 50 is open. A plunger 54 is used to force both the first material 31 and the second material 31 past three-way valve 45, through channel 48 and into the mold cavity 50. The mold cavity 50 is substantially in the shape of a hemispherical half-shell, and is formed by a mold half 55 and a mold half 56.

Figure 6:
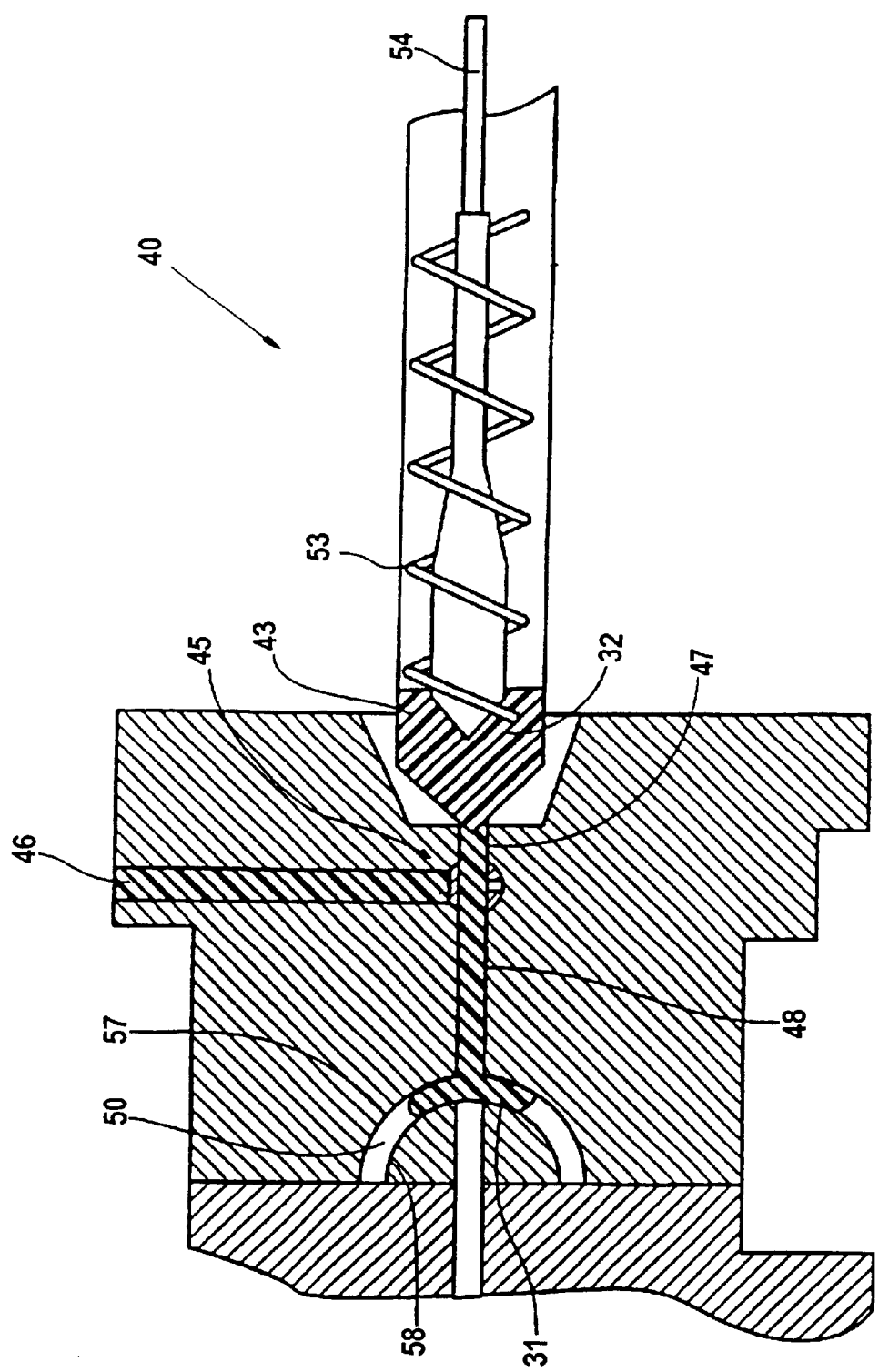
FIG. 6 is an enlarged section of FIG. 5 showing the plunger completing the injection of material to form a cover hemisphere.

Turning to FIG. 6, plunger 54 is translated to the left, pushing materials 31 and 32 through valve 45 along channel 48 into mold cavity 50. At this point, only the first material 31 has entered the mold cavity 50. The flow is circumferential about the channel 48. The mold halves 55 and 56 are cooled so that the molten material solidifies in the mold cavity 50. Preferably, the mold halves 55 and 56 are maintained at a temperature below about 100° F. Most preferably, the mold halves are maintained at a temperature below 50° F. so that the molten material freezes to the mold walls 57 and 58. First material 31, thus, flows into the mold cavity 50 and substantially adheres to the cavity surfaces 57 and 58 of mold cavity 50. Since there is a sharp temperature gradient in the first material 31, hot in the center and cold on the edges against the mold halves 55 and 56, the flow of material is much easier through the center. The material must be pushed into the mold cavity 50 with sufficient pressure to allow the material to fill the cavity 50 before it solidifies.

Figure 7:
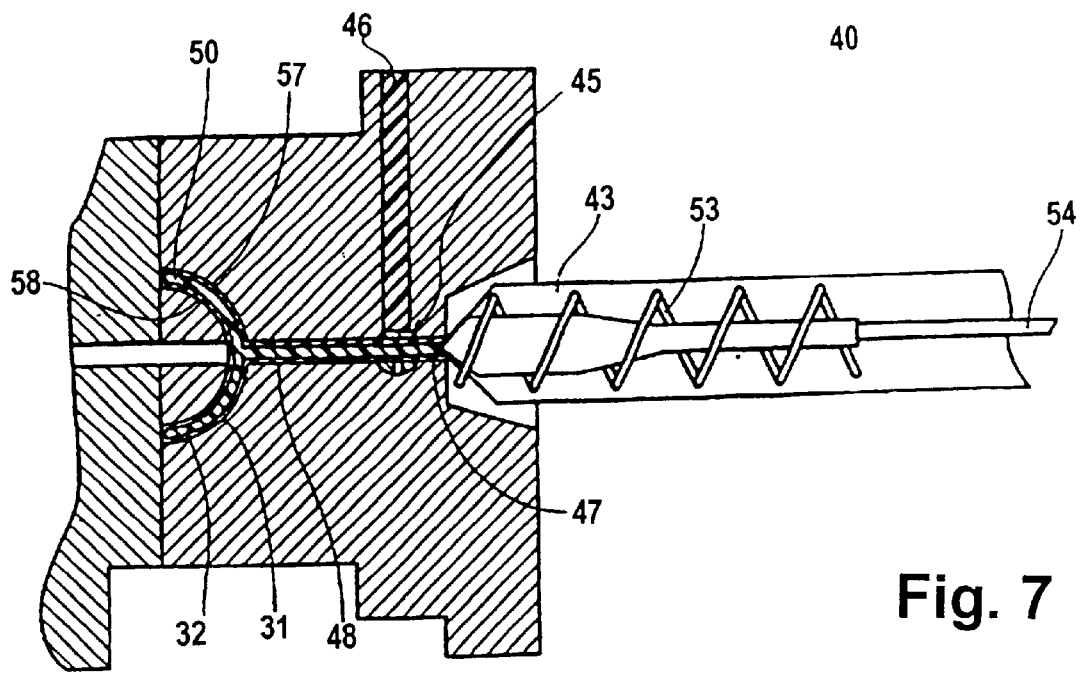
FIG. 7 is an enlarged section of FIG. 5 showing the plunger completing the injection of material to form a cover hemisphere.

Referring now to FIG. 7, second material 32 with the first material 31 substantially fills the mold cavity 50. The second material 23 follows the first material 31. The mold 44 is maintained at a temperature much lower than the melting temperature of the first material 31, generally a temperature of less than 100° F., and preferably about 50° F. Because of this the first material 31 solidifies against the surfaces 57 and 58 of the mold cavity 50 as it flows into the mold cavity 50. Flow into the mold cavity 50 is, thus, through the middle or center of the first material 31. Since 5 the second material 32 follows the first material 31, it flows through the center of the inner and outer layers 24 and 26, forming an intermediate layer 25 (see FIG. 3). In order to increase the thickness of the inner and outer layers 24 and 26, more first material 31 can be used and the flow rate into the mold decreased. To make thinner inner and outer layers 24 and 26, less first material 31 is used and the flow rate into the mold increased. Preferably, the intermediate layer 25 comprises about ⅖ to ⅘ of the cover thickness with the outer layer 26 comprising about ⅕ or less of the thickness.

Once the materials 31 and 32 cool enough to substantially retain the shape of the mold cavity, the mold halves 55 and 56 are separated, and an ejector 61 (see FIG. 5) ejects a two material, three-layer hemisphere 30 (see in FIG. 3) from the injection molding machine 40.

Referring to FIG. 1, a completed golf ball 20 according to the present invention is shown. Core 21 is surrounded by the inner cover 22 which is comprised of two three-layer hemispheres 30 which have been compression molded together, thereby forming compression molding seam 60. Compression molding hemispheres onto a core generally involves applying pressure and heat to mold the cover hemispheres onto the core and is known in the art. It is contemplated that the core 21 is a solid, polybutadiene type core, a solid core having multiple layers or a wound core.

It is contemplated that first material 31 and second material 32 each comprise one or more polymers. Useful polymers include a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, an ethylene or propylene based polymer, a methyl acrylate, a methyl methacrylate polymer, a polycarbonate, a polyamide, a polyphenylene oxide, a polyether ketone, a polysulfone, an acrylonitrile butadiene polymer, an acrylic styrene-acrylonitrile polymer, a terphthalate polymer, an ethylenevinyl alcohol polymer, a tetrafluoroethylene polymer, a reinforced polymer, or blends thereof. As noted above, the first and second layers should be different polymers or be polymers that have different properties.

Most preferably the first material 31 and second material 32 are comprised of thermoplastic ionomers or of a balata rubber and a thermoplastic ionomer, respectively. Suitable thermoplastic ionomer resins include any number of olefinic based ionomers including SURLYN® and IOTEK®, which are commercially available from DuPont and Exxon, respectively.

Among the preferred materials for first material 31 and/or second material 32 are ionomer resins obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component of the subject invention includes E/X/Y copolymers where E is ethylene, X is a softening comonomer such as an acrylate, e.g., methyl acrylate, iso-butyl acrylate or n-butyl acrylate, present in 1–60 (preferably 10–40, most preferably 10–25), weight percent of the polymer, and Y is ethylenically unsaturated organic acid, such as acrylic or methacrylic acid, present in 5–35 (preferably 10–35, most preferably 10–21) weight percent of the polymer, wherein the acid moiety is neutralized 1–90% (preferably at least 40%, most preferably at least about 60%) to form an ionomer by a cation such as lithium, sodium, potassium, magnesium, calcium, barium, lead, tin, zinc or aluminum, or a combination of such cations. Lithium, sodium, magnesium and/or zinc are preferred. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n- butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art as described, e.g., in U.S. Pat. No. 3,262,272. Such ionomer resins are commercially available from DuPont Co. under the trade name SURLYN®.

Additionally, foamed polymeric materials, in particular, metallocene-based foam resins are suitable for use in the cover layers of the present invention.

Still further, the first or second materials 31 or 32 can be comprised of balata rubber or of a synthetic balata.

In the present invention, first material 31 has a melting point or heat of reaction (cure) temperature that is similar to that of second material 32. Alternatively, first material 31 has a melting point or heat of reaction temperature that is higher than that of second material 32, but at a temperature which does not cause degradation of second material 32. In another alternative embodiment, second material 32 has a melting point or heat of reaction temperature that is higher than that of first material 31, but at a temperature which does not cause degradation of first material 31.

Various examples of golf balls according to the present invention are set forth below.

EXAMPLE 1

A polybutadiene core 21 having a diameter of about 1.50 to 1.55 inches can be covered with a three-layer cover comprised of the following:

| Material | FIRST MATERIAL 11 SURLYN 7930 | SECOND MATERIAL 21 SURLYN 8320 |
| --- | --- | --- |
| Composition | 30% | 70% |
| Tensile Strength, psi | 3,800 | 3,100 |
| Tensile Strain @ Break, % | 290 | 770 |
| Flexural Modulus, psi | 67,000 | 2,800 |
| Melt Flow, g/10 min | 1.8 | 0.9 |
| Hardness, Shore D | 68 | 25 |
| Bashore Resilience | 53 | 42 |

*Material properties from supplier's data.

This example can be formed by forming cover hemispheres in a mold. The first and second materials should be heated to approximately 400–425° F. and injected into a 40° F. mold. The first material will adher to the surfaces of the mold to form the inner and outer layers of the cover hemisphere and the second material will flow between the inner and outer layers to form an intermediate layer. The two hemispheres can be compression molded about the polybutadiene core to form the inner cover of the ball. The inner cover is preferably formed to an outer diameter of about 1.55 to 1.64 inches.

Then an outer cover comprised of a thermoset urethane such as that described in U.S. Pat. Nos. 5,334,673 and 6,210,294 or a polyurea material such as that described in U.S. Pat. No. 5,484,870 can be cast over the inner cover layer. These patents are incorporated by reference herein in their entirety.

Preferably, the outer cover has a hardness of about 50 to 60 shore D when measured on the ball. The outer cover material of this example preferably has a flexual modulus of about 5,000 to 30,000 psi.

In an alternate embodiment the first and second materials can be inversed.

EXAMPLE 2

A polybutadiene core having a diameter of about 1.50 to 1.55 inches is covered with an inner cover, which is covered by a three-layer outer cover comprised of the following:

| Material | FIRST MATERIAL 11 SURLYN 8320 | SECOND MATERIAL 21 SURLYN 7930 |
| --- | --- | --- |
| Composition | 30% | 70% |
| Tensile Strength, psi | 3,100 | 3,800 |
| Tensile Strain @ Break, % | 770 | 290 |
| Flexural Modulus; psi | 2,800 | 67,000 |
| Melt Flow, g/10 | 0.9 | 1.8 |
| Hardness, Shore D | 25 | 68 |
| Bashore Resilience | 42 | 53 |

*Material properties from supplier's data.

A golf ball core can be covered with an inner cover such as those described in U.S. Pat. No. 5,688,191, which is incorporated herein in its entirety. Preferably, an inner cover comprising a dynamically vullcanized thermoplastic elastomer, functionalized styrene-butadiene elastomer, metallocene polymer or blends thereof is formed over the core such that the inner cover has an outer diameter of about 1.55 to 1.62 inches.

This example was formed by first forming cover hemispheres in a mold. The first and second materials were heated to approximately 400° F.–425° F. and injected into a 40° F. The first material adhered to the surfaces of the mold to form the inner and outer layers of the cover hemisphere and the second material flowed between the inner and outer layers to form an intermediate layer. The two hemispheres were then compression molded about the inner cover to form the outer cover.

EXAMPLE 3

A polybutadiene core having a diameter of 1.560 inches can be covered with a thin three layer inner cover of the material composition listed in Example 1 above, and a three layer outer cover of the material composition listed in Example 2 above.

This example was formed by first forming the inner cover hemispheres as described in Example 1 and compression molding them about the polybutadiene core, and then forming the outer cover hemispheres as described in Example 2 and molding them about the inner cover to form a golf ball having a total of 7 layers.

EXAMPLE 4

A polybutadiene core having a diameter of 1.560 inches is covered with a thin three layer inner cover of the material composition as listed in Example 2 above, and a three layer outer cover of the material composition listed in Example 2 above.

This example can be made by first, forming the inner cover hemispheres, as described in Example 2, and compression molding them about the polybutadiene core. Then forming the outer cover hemispheres as described in Example 1 and molding them about the inner cover to form a golf ball having a total of 7 layers.

The materials Surlyn 7930 and 8320 are registered trademarks of the DuPont Company. The golf balls in the examples were constructed using a compression molding method. However, it will be apparent to those skilled in the art that the golf balls can also be constructed by the retractable pin injection molding process, which involves injection molding of the cover directly around a core positioned on pins. The pins are removed once the cover material surrounds the core and has solidified to the extent the core will not move. In this process, the compression molding seam 60 can be eliminated. After the cover materials have hardened, the covered core is removed and finished to form a completed golf ball. Based on the teachings herein, the necessary modifications to the standard retractable pin injection molding processes will be readily apparent to those skilled in the art.

Optionally, one or more of the inner layers may serve as moisture barrier layers that will protect against reduced COR values, due to moisture take-up by the core 21. Preferably one of the intermediate layers 25, 28 may serve as a moisture barrier layer, more preferably the intermediate layer 25 will serve as the moisture barrier. The use of moisture barriers is described in co-pending patent application Ser. No. 09/973,342, which is incorporated by reference herein in its entirety.

A moisture barrier should have a moisture vapor transmission rate that is less than that of the outer cover layer, and more preferably, less than the moisture vapor transmission rate of an ionomer resin such as Surlyn®, which has a rate in the range of about 0.45 to about 0.95 grams per mm/m$^2$ per day. The moisture vapor transmission rate is defined as: the mass of moisture vapor that diffuses into a material of a given thickness per unit area per unit time. The preferred standards of measuring the moisture vapor transmission rate include: ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others.

The manipulation of moment of inertia via the filling (or foaming or otherwise reducing specific gravity) of the core 21 and cover layers 24–29 provide the opportunity to further improve upon distance and spin. The low specific gravity core 21 or layers 24–29 can be made from a number of suitable materials, so long as the low specific gravity contributes to the soft compression and resilience of the golf ball. The material can be from a thermosetting syntactic foam with hollow sphere fillers or microspheres in a polymeric matrix of epoxy, urethane, polyester or any suitable thermosetting binder, where the cured composition has a specific gravity less than 1.1 g/cc and preferably less than 1.0 g/cc. Additionally, any number of foamed or otherwise specific gravity reduced thermoplastic or thermosetting polymer compositions or foaming agents may also be used such as metallocene-catalyzed polymers and blends thereof described in U.S. Pat. Nos. 5,824,746 and 6,025,442 which are incorporated by reference herein in their entirety. Further, a thermoset polyurethane composition having a specific gravity or less than 1.3 g/cc such as a nucleated reaction injection molded or cast polyurethane may be used. Such a composition may result in a gas-filled or cellular solid layer.

As discussed in U.S. Pat. No. 5,971,870, which is incorporated by reference herein in its entirety, fillers may be or are typically in a finely divided form. For example, in a size generally less than about 20 mesh, preferably less than about 100 mesh U.S. standard size, except for fibers and flock, which are generally elongated, flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows:

| Filler Type | Sp. Gr. | Comments |
|---|---|---|
| Precipitated hydrated silica | 2.0 | 1, 2 |
| Clay | 2.62 | 1, 2 |
| Talc | 2.85 | 1, 2 |
| Asbestos | 2.5 | 1, 2 |
| Glass fibers | 2.55 | 1, 2 |
| Aramid fibers (KEVLAR ®) | 1.44 | 1, 2 |
| Mica | 2.8 | 1, 2 |
| Calcium metasilicate | 2.9 | 1, 2 |
| Barium sulfate | 4.6 | 1, 2 |
| Zinc sulfide | 4.1 | 1, 2 |
| Lithopone | 4.2–4.3 | 1, 2 |
| Silicates | 2.1 | 1, 2 |
| Silicon carbide patelets | 3.18 | 1, 2 |
| Silicon carbide whiskers | 3.2 | 1, 2 |
| Tungsten carbide | 15.6 | 1 |
| Tungsten oxide | 5.8 | 1 |
| Diatomaceous earth | 2.3 | 1, 2 |
| Polyvinyl chloride | 1.41 | 1, 2 |
| Carbonates | | |
| Calcium carbonate | 2.71 | 1, 2 |
| Magnesium carbonate | 2.20 | 1, 2 |
| Metals and Alloys (powders) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.2 | 1 |
| Iron | 7.86 | 1 |
| Steel | 7.8–7.9 | 1 |
| Lead | 11.4 | 1, 2 |
| Copper | 8.94 | 1 |
| Brass | 8.2–8.4 | 1 |
| Boron | 2.34 | 1 |
| Boron carbide whiskers | 2.52 | 1, 2 |
| Bronze | 8.70–8.74 | 1 |
| Cobalt | 8.92 | 1 |
| Beryllium | 1.84 | 1 |
| Zinc | 7.14 | 1 |
| Tin | 7.31 | 1 |
| Metal Oxides | | |
| Zinc oxide | 5.57 | 1, 2 |
| Iron oxide | 5.1 | 1, 2 |
| Aluminum oxide | 4.0 | |
| Titanium oxide | 3.9–4.1 | 1, 2 |
| Magnesium oxide | 3.3–3.5 | 1, 2 |
| Zirconium oxide | 5.73 | 1, 2 |
| Metal Stearates | | |
| Zinc stearate | 1.09 | 3, 4 |
| Calcium stearate | 1.03 | 3, 4 |
| Barium stearate | 1.23 | 3, 4 |
| Lithium stearate | 1.01 | 3, 4 |
| Magnesium stearate | 1.03 | 3, 4 |
| Particulate carbonaceous materials | | |

-continued

| Filler Type | Sp. Gr. | Comments |
| --- | --- | --- |
| Graphite | 1.5–1.8 | 1, 2 |
| Carbon black | 1.8 | 1, 2 |
| Natural bitumen | 1.2–1.4 | 1, 2 |
| Cotton flock | 1.3–1.4 | 1, 2 |
| Cellulose flock | 1.15–1.5 | 1, 2 |
| Leather fiber | 1.2–1.4 | 1, 2 |
| Micro balloons | | |
| Glass | 0.15–1.1 | 1, 2 |
| Ceramic | 0.2–0.7 | 1, 2 |
| Fly ash | 0.6–0.8 | 1, 2 |
| Coupling Agents Adhesion Promoters | | |
| Titanates | 0.95–1.11 | |
| Zirconates | 0.92–1.11 | |
| Silane | 0.95–1.2 | |

1 Particularly useful for adjusting density of the inner cover layer.
2 Particularly useful for adjusting flex modulus of the inner cover layer.

Figure 10:
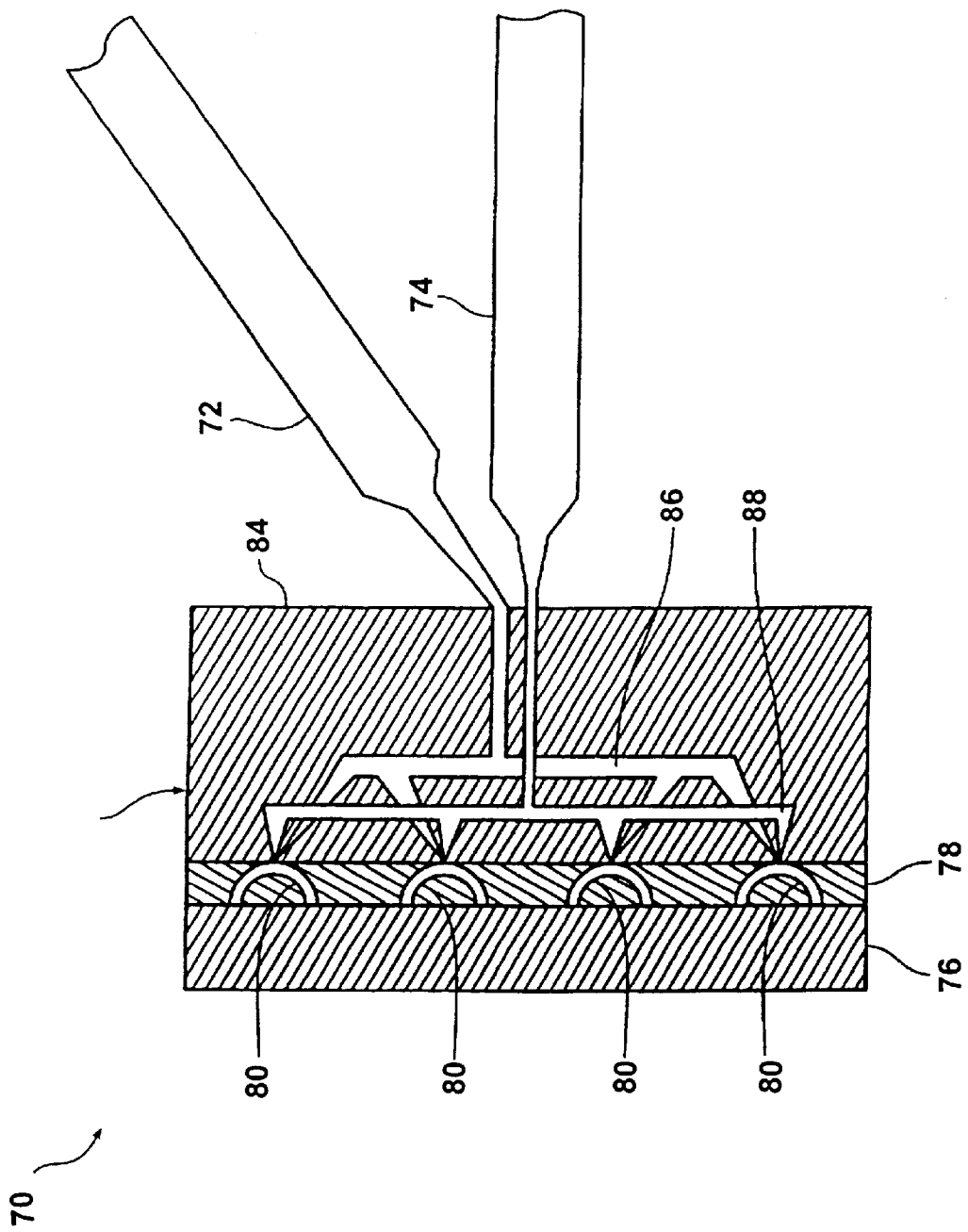
FIG. 10 is an elevational sectional view of a multi-material injection molding machine for making ball cover hemispheres having a hot runner system.

Referring to FIG. 10, golf ball cover hemispheres can also be molded in sandwich injection-molding machine 70 that includes two accumulation chambers 72 and 74 for materials 31 and 32. This sandwich injection-molding machine also includes two mold halves 76 and 78 to form a plurality of mold cavities 80. However, this machine further includes a hot runner system 82 comprised of a hot manifold 84 and hot runners 86 and 88 interconnecting the accumulation chambers 72 and 74 with the mold cavities 80. The hot runners 86 and 88 are maintained at a temperature above the melting point of the materials 31 and 32 so that the material does not solidify therein. A predetermined amount of the first material 31 is fed into the accumulation chamber 72 and injected through the hot runner system 86 into the mold cavities 80. Then a predetermined amount of the second, different material 32 is injected from accumulation chamber 74 through hot runner system 88 and into the mold cavities 80. This eliminates the waist that is created in the cold runner 35 discussed above and creates a quicker molding method.

The present invention allows for a dual cover that may comprise four or six cover layers. The six cover layers may include as many as four different material compositions. Utilizing a diversity of base materials as well as the inclusion of the above density altering materials, a wide range of density and hardness gradients is achievable across an extremely wide spectrum.

While it is apparent that the illustrative embodiments of the invention herein disclosed fulfills the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

We claim:

1. A golf ball comprising:
a core of one or more layers;
an outer cover comprising inner, outer and intermediate layers;
an inner cover between the core and the cover comprising inner, outer and intermediate layers;
the inner and outer layers of the inner cover comprised of a first material comprising of one or more polymers;
the intermediate layer of the inner cover comprised of a second material comprising one or more polymers;
wherein the second material of the inner cover has different physical properties than the first material;
the inner and outer layers of the outer cover comprised of a third material comprising one or more polymers;
the intermediate layer of the outer cover comprised of a fourth material comprising one or more polymers,
wherein the fourth material of the outer cover has different physical properties than the third material.

2. The golf ball of claim 1, wherein the outer layers of the inner and outer covers have a thickness that is less than that of the respective intermediate layers.

3. The golf ball of claim 1, wherein the first material is comprised of one or more polymers selected from the group consisting of a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, and blends thereof.

4. The golf ball of claim 3, wherein the second material is comprised of one or more polymers selected from the group consisting of a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarboflate, a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, and blends thereof.

5. The golf ball of claim 1, wherein the third material is comprised of one or more polymers selected from the group consisting of a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, and blends thereof.

6. The golf ball of claim 5, wherein the fourth material is comprised of one or more polymers selected from the group consisting of a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, and blends thereof.

7. The golf ball of claim 1, wherein the core is solid and comprised of more than one layer.

8. The golf ball of claim 1, wherein the core is a wound core.

9. The golf ball of claim 1, wherein the core is a dual core.

10. A golf ball comprising:

a core of one or more layers;

an outer cover comprising inner, outer, and intermediate layers;

an inner cover between the core and the outer cover comprising one or more layers;

the inner and outer layers of the outer cover comprising of a first material comprised of one or more polymers; and the intermediate layer of the outer cover comprising of a second material comprised one or more polymers, wherein the second material has different physical properties than the first material.

11. The golf ball according to claim 10, wherein the outer layer of the outer cover has a thickness that is less than that of the intermediate layer.

12. The golf ball of claim 10, wherein the first material is comprised of one or more polymers selected from the group consisting of a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, and blends thereof.

13. The golf ball of claim 10, wherein said second material is comprised of one or more polymers selected from the group consisting of a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, and blends thereof.

14. The golf ball according to claim 10, wherein the core is a solid core.

15. The golf ball according to claim 10, wherein the core is a wound core.

16. The golf ball according to claim 10, wherein the core is solid and comprised of more than one layer.

* * * * *